United States Patent
Tam et al.

(10) Patent No.: US 9,556,537 B2
(45) Date of Patent: *Jan. 31, 2017

(54) ULTRA-HIGH STRENGTH UHMW PE FIBERS AND PRODUCTS

(71) Applicant: HONEYWELL INTERNATIONAL INC., Morristown, NJ (US)

(72) Inventors: Thomas Y. Tam, Chesterfield, VA (US); John A. Young, Midlothian, VA (US); Norman Aminuddin, Waynesboro, VA (US); John E. Hermes, Colonial Heights, VA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 429 days.

This patent is subject to a terminal disclaimer.

(21) Appl. No.: 14/294,805

(22) Filed: Jun. 3, 2014

(65) Prior Publication Data

US 2014/0283674 A1 Sep. 25, 2014

Related U.S. Application Data

(60) Division of application No. 12/771,914, filed on Apr. 30, 2010, now Pat. No. 8,747,715, which is a
(Continued)

(51) Int. Cl.
| | |
|---|---|
| *B29C 47/78* | (2006.01) |
| *D01D 5/098* | (2006.01) |
| *D01D 5/12* | (2006.01) |
| *D01F 6/04* | (2006.01) |
| *D01D 5/06* | (2006.01) |
| *D01D 1/02* | (2006.01) |

(Continued)

(52) U.S. Cl.
CPC ............ *D01D 5/098* (2013.01); *B29C 47/822* (2013.01); *D01D 1/02* (2013.01); *D01D 5/06* (2013.01); *D01D 5/12* (2013.01); *D01F 6/04* (2013.01); *F41H 5/02* (2013.01)

(58) Field of Classification Search
CPC .......... B32B 2571/02; D01F 6/04; D01F 6/30
See application file for complete search history.

(56) References Cited

U.S. PATENT DOCUMENTS

| | | | |
|---|---|---|---|
| 4,344,908 | A | 8/1982 | Smith et al. |
| 4,413,110 | A | 11/1983 | Kavesh et al. |

(Continued)

FOREIGN PATENT DOCUMENTS

| | | |
|---|---|---|
| EP | 0212133 | 3/1987 |
| EP | 2 080 824 A1 | 7/2009 |

(Continued)

OTHER PUBLICATIONS

International Search Report for International Application No. PCT/US2011/033714.
(Continued)

*Primary Examiner* — James Sanders
(74) *Attorney, Agent, or Firm* — Roberts & Roberts, LLP; Richard S. Roberts, Jr.

(57) ABSTRACT

Multi-filament UHMW PE yarns can be produced according to processes that result in improved properties. The UHMW PE can have an intrinsic viscosity in decalin at 135° C. of at least about 30 dl/g, and can be processed under optimal conditions to achieve a gel spun yarn having a tenacity of greater than about 45 g/d (40.5 g/dtex).

20 Claims, 3 Drawing Sheets

Related U.S. Application Data continuation-in-part of application No. 12/589,285, filed on Oct. 21, 2009, now Pat. No. 7,736,561, which is a continuation of application No. 11/811,570, filed on Jun. 8, 2007, now Pat. No. 7,638,191.

(51) Int. Cl.
*F41H 5/02* (2006.01)
*B29C 47/82* (2006.01)

(56) References Cited

U.S. PATENT DOCUMENTS

| | | |
|---|---|---|
| 4,430,383 A | 2/1984 | Smith et al. |
| 4,551,296 A | 11/1985 | Kavesh et al. |
| 4,655,769 A | 4/1987 | Zachariades |
| 4,663,101 A | 5/1987 | Kavesh et al. |
| 4,870,136 A | 9/1989 | Yagi et al. |
| 4,894,281 A | 1/1990 | Yagi et al. |
| 5,032,338 A | 7/1991 | Weedon et al. |
| 5,037,928 A | 8/1991 | Li et al. |
| 5,068,073 A | 11/1991 | Pennings et al. |
| 5,160,472 A | 11/1992 | Zachariades |
| 5,200,129 A | 4/1993 | Kobayashi et al. |
| 5,342,567 A | 8/1994 | Chen et al. |
| 5,702,657 A | 12/1997 | Yoshida et al. |
| 5,741,451 A | 4/1998 | Dunbar et al. |
| 5,849,232 A | 12/1998 | Ochi et al. |
| 6,287,689 B1 | 9/2001 | Elliott et al. |
| 6,433,120 B1 | 8/2002 | Rastogi et al. |
| 6,448,359 B1 | 9/2002 | Kavesh |
| 6,770,365 B2 | 8/2004 | Yoshimura et al. |
| 6,969,553 B1 | 11/2005 | Tam et al. |
| 7,081,298 B2 | 7/2006 | Nakanishi |
| 7,370,395 B2 | 5/2008 | Tam |
| 7,846,363 B2 | 12/2010 | Tam et al. |
| 2005/0093200 A1 | 5/2005 | Tam et al. |
| 2007/0231572 A1 | 10/2007 | Tam et al. |
| 2008/0251212 A1 | 10/2008 | Harding et al. |
| 2008/0305331 A1 | 12/2008 | Tam et al. |
| 2008/0318016 A1 | 12/2008 | Weedon et al. |
| 2009/0048628 A1 | 2/2009 | Marissen |
| 2010/0286728 A1 | 11/2010 | Simmelink et al. |
| 2011/0268967 A1 | 11/2011 | Tam et al. |
| 2011/0269359 A1 | 11/2011 | Tam et al. |

FOREIGN PATENT DOCUMENTS

| | | |
|---|---|---|
| JP | 6-1174416 A | 8/1986 |
| JP | 6-166028 A | 6/1994 |
| JP | 2001-207339 A | 8/2001 |
| JP | 2001-207340 A | 8/2001 |
| JP | 2009500091 | 1/2009 |
| WO | 90/11060 A1 | 10/1990 |
| WO | 9700766 | 1/1997 |
| WO | 2005/066401 A1 | 7/2005 |
| WO | 2005066400 | 7/2005 |
| WO | 2005066401 | 7/2005 |
| WO | 2009043597 | 4/2009 |
| WO | 2009077168 | 6/2009 |
| WO | 2009124762 | 10/2009 |
| WO | 2009/153314 A1 | 12/2009 |
| WO | 2011137045 | 11/2011 |

OTHER PUBLICATIONS

Supplementary European Search Report for European Patent Application No. EP12804252.
Penning, J.P. et al. "Influence of chemical crosslinking on the creep behavior of ultra-high molecular weight polyethylene fibers," Colloid and Polymer Science, Jun. 1994, vol. 272, No. 6, p. 664-676.
Maghsoud, Z. et al., "Gel spinning characteristics of ultra-high molecular weight polyethylene and study on fibre structure before drawing," Iranian Polymer Journal (English Edition), Jun. 2007, vol. 16, No. 6, p. 363-373.
Yao, W-H. et al., "A study on preparation and mechanical properties of UHMWPE/nylon composite covered yarn," Proceedings of SPIE—The International Society for Optical Engineering, 2nd International Conference on Smart Materials and Nanotechnology in Engineering Language, 2009, vol. 7493, p. 74932A-1-74932A-8.
Sakai, Y. et al., "Mechanical properties of biaxially drawn films of ultra-high molecular weight polyethylene dried gels," Polymer, 1993, vol. 34, No. 2, p. 318-322.
Smook, J. et al., "Preparation of ultra-high strength polyethylene fibres by gel-spinning/hot-drawing at high spinning rates," Polymer Bulletin, Jan. 1983, vol. 9, p. 75-80.
Wood-Adams, Paula et al., "Thermorheological Behavior of Polyethylene: Effects of Microstructure and Long Chain Branching," Macromolecules 2001, 34, pp. 6281-6290.
Yan, D., et al., "Effect of long chain branching on rheological properties of metallocene polyethylene," Polymer Bulletin, 1999, vol. 40, pp. 1737-1744.
Wood-Adams, Paula et al., "Effect of Molecular Structure on the Linear Viscoelastic Behavior of Polyethylene," Macromolecules 2000, vol. 33, pp. 7489-7499.
Chow, A., et al., "Entanglements in Polymer Solutions under Elongational Flow: A Combined Study of Chain Stretching Flow Velocimetry, and Elongational Viscosity," Macromolecules 1988, vol. 21, pp. 250-256.
Smith, Paul et al., "Tensile Strength of Highly Oriented Polyethylene. II. Effect of Molecular Weight Distribution," Journal of Polymer Science: Polymer Physics Edition, vol. 20, pp. 2229-2241 (1982).
Hoogsteen, W. et al., "Gel-spun polyethylene fibres," Journal of Materials Science vol. 23, (1988) pp. 3467-3474.
Pennings, Albert J. et al., "Mechanical properties of ultra-high molecular weight polyethylene fibres in relation to structural changes and chain scissioning upon spinning and hot-drawing," Journal of Materials Science vol. 19 (1984) pp. 3443-3450.
Kalb, B. et al., "Maximum strength and drawing mechanism of hot drawn high molecular weight polyethylene," Journal of Materials Science, vol. 15 (1980) pp. 2584-2590.
Osamu Ishizuka et al., "Elongational viscosity in the isothermal melt spinning of polypropylene," Polymer Jun. 1980, vol. 21, pp. 691-698.
James L. White et al., "Elongational Flow and Melt-Spinning Instability of Concentrated Suspensions of Small Particles in Polymer Melts,"Journal of Applied Polymer Science, 1981, vol. 26, pp. 579-589.
Gwo-Geng Lin et al., "Measurement of Elongation Viscosity for Polymer Melts by Fiber Spinning," Advances in Polymer Technology, Fall 1997, vol. 16, No. 3, pp. 199-207.
A. Makaradi et al., "Effect of Non-Isothermal Oriented Crystallization on the Velocity and Elongational Viscosity Profiles During the Melt Spinning of High Density Polyethylene Fibers," Polymer Engineering and Science Jul. 2001, vol. 41, No. 7, pp. 1107-1114.
F.N. Cogswell, Trans. Soc. Rheology, 16(3), 303-403 (1972).

ULTRA-HIGH STRENGTH UHMW PE FIBERS AND PRODUCTS

CROSS-REFERENCE TO RELATED APPLICATIONS

This application is a Division of co-pending application Ser. No. 12/771,914 filed Apr. 30, 2010, now U.S. Pat. No. 8,747,715 issued on Jun. 10, 2014, which is a continuation-in-part of U.S. patent application Ser. No. 12/589,285 filed on Oct. 21, 2009, now U.S. Pat. No. 7,736,561 issued on Jun. 15, 2010, which is a continuation of U.S. patent application Ser. No. 11/811,570 filed on Jun. 8, 2007, now U.S. Pat. No. 7,638,191 issued on Dec. 29, 2009.

FIELD OF THE INVENTION

The present technology relates to ultra-high molecular weight polyethylene (UHMW PE) filaments and yarns formed from such filaments, as well as to processes for the preparation of UHMW PE filaments.

DESCRIPTION OF RELATED ART

Multi-filament UHMW PE yarns, produced from polyethylene resins of ultra-high molecular weight, have been produced possessing high tensile properties such as tenacity, tensile modulus and energy-to-break. Multi-filament "gel spun" UHMW PE yarns are produced, for example, by Honeywell International Inc. The gel-spinning process discourages the formation of folded chain molecular structures and favors formation of extended chain structures that more efficiently transmit tensile loads. The yarns are useful in numerous applications.

Polyethylene resins of ultra-high molecular weight are produced, for example, in Japan, by Mitsui Chemicals, in Europe by Ticona Engineered Polymers and DSM; in Brazil by Braskem, in India by Reliance and by at least one company in China. The first commercial production of high strength, high modulus fibers from UHMW PE resin by solution spinning was by AlliedSignal Co. in 1985. In the two decades of commercial fiber production since then, experience has shown that UHMW PE resins having nominally the same molecular characteristics such as average molecular weight as measured by intrinsic viscosity, molecular weight distribution and level of short chain branching may process in very different ways. For example, ostensibly duplicate lots of UHMW PE resin from the same supplier have been found to process quite differently.

SUMMARY OF THE INVENTION

The present technology relates to ultra-high molecular weight polyethylene (UHMW PE) filaments and yarns formed from such filaments, as well as to processes for the preparation of UHMW PE filaments.

In one aspect, a processes for producing gel spun yarn made from ultra high molecular weight polyethylene (UHMW PE) is provided that includes steps of: feeding a slurry that comprises an UHMW PE and a spinning solvent to an extruder to produce a liquid mixture, the UHMW PE having an intrinsic viscosity in decalin at 135° C. of at least about 30 dl/g; passing the liquid mixture through a heated vessel to form a homogeneous solution comprising the UHMW PE and the spinning solvent; providing the solution from the heated vessel to a spinneret to form a solution yarn; drawing the solution yarn that issues from the spinneret at a draw ratio of from about 1.1:1 to about 30:1 to form a drawn solution yarn; cooling the drawn solution yarn to a temperature below the gel point of the UHMW PE polymer to form a gel yarn; drawing the gel yarn in one or more stages at a first draw ratio DR1 of from about 1.1:1 to about 30:1; drawing the gel yarn at a second draw ratio DR2; removing spinning solvent from the gel yarn in a solvent removal device to form a dry yarn; drawing the dry yarn at a third draw ratio DR3 in at least one stage to form a partially oriented yarn; transferring the partially oriented yarn to a post drawing operation; and drawing the partially oriented yarn in the post drawing operation to a fourth draw ratio DR4 of from about 1.8:1 to about 15:1 to form a highly oriented yarn product having a tenacity of greater than about 45 g/d (40.5 g/dtex).

In another aspect, a processes for producing gel spun yarn made from ultra high molecular weight polyethylene (UHMW PE) is provided that includes steps of: feeding a slurry that comprises an UHMW PE and a spinning solvent to an extruder to produce a liquid mixture, the UHMW PE having an average particle size from about 100 microns to about 200 microns and an intrinsic viscosity in decalin at 135° C. of at least about 30 dl/g; passing the liquid mixture through a heated vessel having a temperature from about 220° C. to about 320° C. to form a homogeneous solution comprising the UHME PE and the spinning solvent, the solution including UHME PE in an amount from about 5% by weight to about 20% by weight of the solution; providing the solution from the heated vessel to a spinneret to form a solution yarn; drawing the solution yarn that issues from the spinneret at a draw ratio of from about 1.1:1 to about 30:1 to form a drawn solution yarn; cooling the drawn solution yarn to a temperature below the gel point of the UHMW PE polymer to form a gel yarn; drawing the gel yarn in one or more stages at a first draw ratio DR1 of from about 1.1:1 to about 30:1; drawing the gel yarn at a second draw ratio DR2; removing spinning solvent from the gel yarn in a solvent removal device to form a dry yarn; drawing the dry yarn at a third draw ratio DR3 in at least one stage to form a partially oriented yarn, the partially oriented yarn having an intrinsic viscosity of greater than about 19 dl/g; transferring the partially oriented yarn to a post drawing operation; and drawing the partially oriented yarn in the post drawing operation to a fourth draw ratio DR4 of from about 1.8:1 to about 15:1 to form a highly oriented yarn product having a tenacity of greater than about 45 g/d (40.5 g/dtex.).

BRIEF DESCRIPTION OF THE DRAWINGS

Specific examples have been chosen for purposes of illustration and description, and are shown in the accompanying drawings, forming a part of the specification.

DETAILED DESCRIPTION

Filaments and yarns made by gel spinning polymers such as ultra high molecular weight polyolefins (UHMW PO), and in particular ultra-high molecular weight polyethylene (UHMW PE), can be utilized in a wide variety of applications, including, but not limited to, ballistic articles such as body armor, helmets, breast plates, helicopter seats, spall shields; composite materials utilized in applications including sports equipment such as kayaks, canoes, bicycles and boats; as well as in fishing line, sails, ropes, sutures and fabrics.

Figure 1:
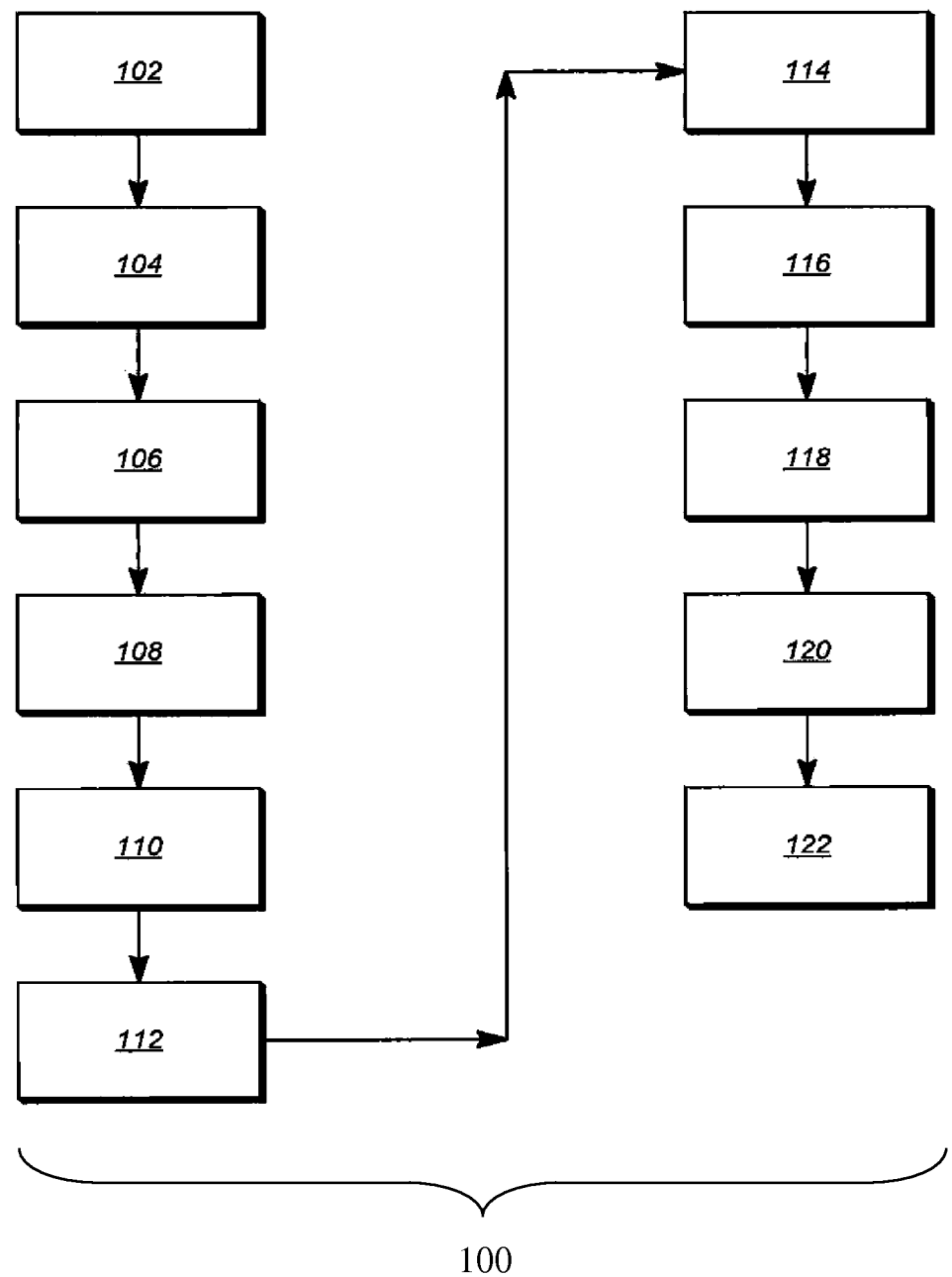
FIG. 1 illustrates a process flow diagram for producing UHMW PE gel spun filaments and yarns.

Generally speaking, "gel spinning" processes involve forming of a solution of polymer, such as UHMW PE, and a spinning solvent, passing the solution through a spinneret to form a solution yarn including a plurality of solution filaments, also referred to as being fibers, cooling the solution yarn to form a gel yarn, removing the spinning solvent to form an essentially dry yarn, and stretching at least one of the solution yarn, the gel yarn or the dry yarn. As used herein, a "filament" or "fiber" is an elongate body the length dimension of which is much greater than the transverse dimensions of width and thickness. Accordingly, the terms "filament" and "fiber" include a ribbon, a strip, and other types of elongate body shapes, and can have a regular or irregular cross-section. As used herein, "yarn" is a continuous strand formed from, or made up of, a plurality of fibers or filaments. FIG. 1 provides a flow chart for one example of a gel spinning process 100 for producing UHMW PE gel spun filaments and yarns.

The solution can include UHMW PE in an amount from about 1% by weight to about 50% by weight of the solution, preferably from about 2% by weight to about 30% by weight of the solution, and more preferably from about 5% by weight to about 20% by weight of the solution, or from about 6% by weight to about 10% by weight of the solution. The step of forming the solution can include forming a slurry that includes the UHME PE and the spinning solvent. The components of the slurry can be provided in any suitable manner. For example, the slurry can be formed by combining the UHME PE and the spinning solvent, and then providing the combined UHME PE and spinning solvent to an extruder 102. Alternatively, the slurry can be formed by combining the UHME PE and the spinning solvent within the extruder 102. The slurry can be formed at a temperature that is below the temperature at which the UHME PE will melt, and is thus also below the temperature at which the UHME PE will dissolve in the spinning solvent. For example, the slurry can be formed at room temperature, or can be heated to a temperature of up to about 110° C. In the slurry, the weight ratio of the UHMW PE polymer to the spinning solvent can be from about 5:95 to about 95:5. Preferably, the weight ratio of UHMW PE polymer to solvent can be from about 6:94 to about 50:50, and more preferably from about 8:92 to about 30:70.

The UHMW PE that is selected for use in the gel spinning process preferably has one or more preferred properties. For example, the UHMW PE can have an intrinsic viscosity in decalin at 135° C. of at least about 30 dl/g, or greater than about 30 dl/g, including being from about 30 dl/g to about 100 dl/g, or greater than about 100 dl/g. In some examples, the UHMW PE can have an intrinsic viscosity in decalin at 135° C. of about 30 dl/g, about 35 dl/g, about 40 dl/g, about 45 dl/g, about 50 dl/g, about 55 dl/g, about 60 dl/g, about 65 dl/g, about 80 dl/g, about 85 dl/g, about 90 dl/g, about 95 dl/g, or about 100 dl/g.

As another example, a 10 wt. % solution of the UHMW PE in mineral oil at 250° C., meaning that there are 10 parts by weight of UHMW PE per 100 parts by weight of the total solution, can have a desired Cogswell extensional viscosity ($\lambda$) in Pascal-seconds (Pa-s) and a desired shear viscosity. In a first method of selecting an UHMW PE having a desired Cogswell extensional viscosity ($\lambda$) in Pascal-seconds (Pa-s) and a desired shear viscosity, the 10 wt. % solution of the UHMW PE in mineral oil at 250° C. can have a Cogswell extensional viscosity in accordance with the following formula:

$$\lambda \geq 5{,}917(IV)^{0.8}$$

In one such example, a 10 wt. % solution of the UHMW PE in mineral oil at a temperature of 250° C. can have a Cogswell extensional viscosity at least 65,000 Pa-s. In another example, a 10 wt. % solution of the UHMW PE in mineral oil at a temperature of 250° C. can have a Cogswell extensional viscosity ($\lambda$) in Pascal-seconds (Pa-s) in accordance with the following formula:

$$\lambda \geq 7{,}282(IV)^{0.8}$$

In yet another example, a 10 wt. % solution of the UHMW PE in mineral oil at a temperature of 250° C. can have a Cogswell extensional viscosity ($\lambda$) in Pascal-seconds (Pa-s) in accordance with the following formula:

$$\lambda \geq 10{,}924(IV)^{0.8}$$

In some examples, the 10 wt. % solution of the UHMW PE in mineral oil at 250° C. has a Cogswell extensional viscosity that is both greater than or equal to $5{,}917(IV)^{0.8}$, $7{,}282(IV)^{0.8}$, or $10{,}924\,(IV)^{0.8}$, and is also at least five times greater than the shear viscosity of the solution.

In a second method of selecting an UHMW PE having a desired Cogswell extensional viscosity ($\lambda$) in Pascal-seconds (Pa-s) and a desired shear viscosity, the 10 wt. % solution of the UHMW PE in mineral oil at 250° C. can have a Cogswell extensional viscosity that is at least eight times the shear viscosity. In other words, the Cogswell extensional viscosity can be greater than or equal to eight times the shear viscosity, regardless of whether the Cogswell extensional viscosity is greater than or equal to $5{,}917(IV)0.8$. In one example, a 10 wt. % solution of the UHMW PE in mineral oil at 250° C. has a Cogswell extensional viscosity and a shear viscosity such that the Cogswell extensional viscosity is at least eleven times the shear viscosity. In such examples, the Cogswell extensional viscosity can also be greater than or equal to $5{,}917(IV)^{0.8}$, $7{,}282(IV)^{0.8}$, or $10{,}924\,(IV)^{0.8}$.

In conducting the gel spinning processes described herein, the shear viscosity and the Cogswell extensional viscosity ($\lambda$) can be measured in accordance with the exemplary procedures described below.

A solution of UHMW PE was prepared at a concentration of 10 wt. % in HYDROBRITE® 550 PO white mineral oil, available from Sonnebom, Inc. The white mineral oil had a density of from about 0.860 g/cm3 to about 0.880 g/cm3 as measured by ASTM D4052 at a temperature of 25° C., and a kinematic viscosity of from about 100 cSt to about 125 cSt as measured by ASTM D455 at a temperature of 40° C. The white mineral oil also consisted of from about 67.5% paraffinic carbon to about 72.0% paraffinic carbon, and from about 28.0% to about 32.5% napthenic carbon by ASTM D3238. The white mineral oil had a 2.5% distillation temperature of about 298° C. at 10 mm Hg as measured by ASTM D1160, and also had an average molecular weight of about 541 as measured by ASTM D2502.

The solution was formed at elevated temperature in a twin screw extruder, although other conventional devices, including but not limited to a Banbury Mixer, would also be suitable. The solution was cooled to a gel state, and the gel was charged to the identical twin barrels of a Dynisco Corp. LCR 7002 Dual Barrel Capillary Rheometer. Pistons were placed in the twin barrels of the rheometer. The barrels of the rheometer were maintained at a temperature of 250° C., and the polymer gel was converted back into a solution and was equilibrated at that temperature. The pistons were driven into the barrels of the rheometer simultaneously by a common mechanism.

The polymer solution was extruded through a capillary die at the exit of each barrel. The dies each had a capillary diameter (D) of 1 mm. One die had a capillary length (L1) of 30 mm; the other had a capillary length (L2) of 1 mm. Pressure transducers mounted above the dies measured the pressures (P1, P2) developed in each barrel.

The test proceeded by actuating the motion of the pistons at a series of speed steps increasing in ratios of about 1.2:1. The piston speeds and barrel pressures developed were recorded. The rheometer automatically stepped to the next speed level when a steady state has been achieved. The pressure and speed data were automatically transferred to a spread sheet program provided with the Dynisco Corp. LCR 7002 Dual Barrel Capillary Rheometer that performed the necessary calculations. The discharge rate (Q, cm3/sec) of the UHMW PE solution was calculated from the piston diameter and the piston speed.

The apparent shear stress at the wall of a capillary $\tau a,i$ can be calculated from the relationship:

$$\tau_{a,i} = \frac{DP_i}{4L_i}$$

where i is 1, 2 corresponding to barrel 1 or barrel 2

The apparent shear rate at the capillary wall can be calculated as:

$$\dot{\gamma}_{a,i} = \frac{32Q}{\pi D^3}$$

The apparent shear viscosity can be defined as:

$$\eta_{a,i} = \frac{\tau_{a,i}}{\dot{\gamma}_{a,i}}$$

A correction, known as the Rabinowitsch correction, can be applied to the shear rate to correct for the non-Newtonian character of the polymer solution. The true shear rate at the wall of the capillary can be calculated as:

$$\dot{\gamma}_i = \left[\frac{3n^* + 1}{4n^*}\right]\dot{\gamma}_{a,i}$$

where n* is the slope of a plot of log $\tau_{a,i}$ to versus log $\dot{\gamma}_{a,i}$.

A correction, known as the Bagely correction can be applied to the shear stress to account for the energy lost in funneling the polymer solution from the barrel into the die. This extra energy loss can appear as an increase in the effective length of the die. The true shear stress is given by:

$$\tau_i = \frac{D}{4L}(P_i - P_0)$$

$P_0$ can be obtained from a linear regression of $P_1$ and $P_2$ versus $L_1$ and $L_2$. $P_0$ is the intercept at L=0.

The true shear viscosity can be obtained as a function of shear rate as follows:

$$\eta_i = \frac{\tau_i}{\dot{\gamma}_i}$$

The shear viscosity can be defined as the value at a shear rate of 1 sec$^{-1}$.

As the polymer solution flows from the barrel of the rheometer into a die, the streamlines converge. Such a flow field can be interpreted as an extensional deformation superposed onto a simple shear flow. Cogswell, showed how these components can be treated separately as a way of measuring extensional rheology (F. N. Cogswell, *Trans. Soc. Rheology*, 16(3), 383-403 (1972)).

The extensional stress $\sigma_e$ and the extensional strain $\epsilon$ can be given by Equations 7 and 8, respectively, as follows:

$$\sigma_e = 3/8(n+1)P_0$$

$$\varepsilon_i = \frac{4\eta_i \dot{\gamma}_i^2}{3(n+1)P_0)}$$

The Cogswell extensional viscosity ($\lambda$) can then be calculated as follows $$\lambda_i = \frac{9(n+1)^2}{32\eta_i}\left(\frac{P_0}{\dot{\gamma}_i}\right)^2$$

where n in Eqs. 7-9 is the slope of a plot of log $\sigma_e$ versus log $\epsilon_i$.

For purposes of the invention, the Cogswell extensional viscosity can be defined as the value at an extensional rate of 1 sec$^{-1}$.

With respect to the molecular structure of the UHMW PE selected for use in the gel spinning processes disclosed herein, it is preferred that the UHMW PE have fewer than 10 short side branches per 1,000 carbon atoms, the short side branches comprising from 1 to 4 carbon atoms. For example, the UHMW PE can have fewer than 5 short side branches per 1,000 carbon atoms, fewer than 2 short side branches per 1,000 carbon atoms, fewer than 1 short side branch per 1,000 carbon atoms, or fewer than 0.5 short side branches per 1000 carbon atoms. Side groups may include but are not limited to $C_1$-$C_{10}$ alkyl groups, vinyl terminated alkyl groups, norbornene, halogen atoms, carbonyl, hydroxyl, epoxide and carboxyl.

The UHMW PE polymer can also contain small amounts, generally less than about 5 wt. %, preferably less than about 3 wt. %, and more preferably less than about 2 wt. %, of additives such as anti-oxidants, thermal stabilizers, colorants, flow promoters, solvents, and other additives. In examples where the UHMW PE polymer contains at least one anti-oxidant, the anti-oxidant can be selected from the group consisting of hindered phenols, aromatic phosphites, amines and mixtures thereof. Preferably, the anti-oxidant can be selected from the group consisting of (2,6-di-tert-butyl-4-methyl-phenol, tetrakis [methylene(3,5-di-tert-butylhydroxyhydrocinnamate)]methane, tris(2,4-di-tert-butylphenyl)phosphite, octadecyl 3,5-di-tert-butyl-4-hyroxyhydrocinnamate, 1,3,5-tris(3,5-di-tert-butyl-4-hydroxybenzyl)-1,3,5-triazine-2,4,6 (1H,3H,5H)-trione, 2,5, 7,8 tetramethyl-2(4',8',12'-trimethyltridecyl)chroman-6-ol and mixtures thereof. In one example, the anti-oxidant can be 2,5,7,8tetramethyl-2(4',8',12'-trimethyltridecyl)chroman-6-ol commonly known as Vitamin E or α-tocopherol.

As has been discussed in U.S. Pat. No. 5,032,338, which is hereby incorporated by reference, the particle size and particle size distribution of the UHMW PE polymer can have an affect on the extent to which the UHMW PE polymer dissolves during formation of the solution that is to be gel spun. As discussed further below, it is desirable that the UHMW PE polymer be completely dissolved in the solution. Accordingly, in one preferred example, the UHMW PE can have an average particle size from about 100 microns to about 200 microns. In such an example, it is preferred that up to about, or at least about 90% of the particles have a particle size that is within 40 microns of the average particle size. In other words, up to about, or at least about 90% of the particles have a particle size that is equal to the average particle size plus or minus 40 microns. In another example, about 75% by weight to about 100% by weight of the UHMW PE particles utilized can have a particle size of from about 100 microns to about 400 microns, and preferably about 85% by weight to about 100% by weight of the particles have a particle size between about 120 microns and 350 microns. Additionally, the particle size can be distributed in a substantially Gaussian curve of particle sizes centered at about 125 to 200 microns. It is also preferred that about 75% by weight to about 100% by weight of the UHMW PE particles utilized have a weight average molecular weight of from about 300,000 to about 7,000,000, more preferably from about 700,000 to about 5,000,000. It is also preferred that at least about 40% of the particles be retained on a No. 80 mesh screen.

The spinning solvent can be any suitable spinning solvent, including, but not limited to, a hydrocarbon that has a boiling point over 100° C. at atmospheric pressure. The spinning solvent can be selected from the group consisting of hydrocarbons such as aliphatics, cyclo-aliphatics, and aromatics; and halogenated hydrocarbons such as dichlorobenzene; and mixtures thereof. In some examples, the spinning solvent can have a boiling point of at least about 180° C. at atmospheric pressure. In such examples, the spinning solvent can be selected from the group consisting of halogenated hydrocarbons, mineral oil, decalin, tetralin, naphthalene, xylene, toluene, dodecane, undecane, decane, nonane, octene, cis-decahydronaphthalene, trans-decahydronaphthalene, low molecular weight polyethylene wax, and mixtures thereof. In one example, the spinning solvent is selected from the group consisting of mineral oil, decalin, and mixtures thereof.

The extruder 102 to which the slurry is provided can be any suitable extruder, including for example a twin screw extruder such as an intermeshing co-rotating twin screw extruder. The gel spinning process can include extruding the slurry with the extruder 102 to form a mixture, preferably an intimate mixture, of the UHMW PE polymer and the spinning solvent. Extruding the slurry to form the mixture can be done at a temperature that is above the temperature at which the UHMW PE polymer will melt. The mixture of UHMW PE polymer and spinning solvent that is formed by the extruder 102 can thus be a liquid mixture of molten UHMW PE polymer and spinning solvent. The temperature at which the liquid mixture of molten UHMW PE polymer and spinning solvent is formed in the extruder can be from about 140° C. to about 320° C., preferably from about 220° C. to about 320° C., and more preferably from about 220° C. to about 280° C.

One example of a method for processing the slurry through the extruder is described in co-pending U.S. patent application Ser. No. 11/393,218, which is incorporated herein by reference, which describes that the capacity of an extruder scales as approximately the square of the screw diameter. A figure of merit for an extrusion operation is therefore the proportion between the polymer throughput rate and the square of the screw diameter. In at least one example, the slurry is processed such that the throughput rate of UHMW PE polymer in the liquid mixture of molten UHMW PE polymer and spinning solvent is at least the quantity 2.5 $D^2$ grams per minute (g/min), wherein D represents the screw diameter of the extruder in centimeters. For example, the throughput rate of UHMW PE polymer can be at least 4 $D^2$ g/min, at least 6 $D^2$ g/min, or at least 10 $D^2$ g/min, at least 15.8 $D^2$ g/min, at least 20 $D^2$ g/min, at least 30 $D^2$ g/min, or at least 40 $D^2$ g/min. Accordingly, the throughput rate of UHMW PE polymer can be from about 2.5 $D^2$ g/min to about 40 $D^2$ g/min, wherein D is the screw diameter of the extruder in centimeters.

The average residence time of the UHMW PE and spinning solvent in the extruder 102 can be less than about 0.6 D, where D is the screw diameter in centimeters. In one example, the average residence time of the UHMW PE and spinning solvent in the extruder less than about 0.4 D. The average residence time can be defined as the free volume of the extruder (barrel minus screw) divided by the volumetric throughput rate. For example, an average residence time in minutes can be calculated by dividing the free volume in $cm^3$ by the throughput rate in $cm^3$/min.

After formation of the liquid mixture of UHMW PE and spinning solvent, the gel spinning process 100 can include passing the liquid mixture through a heated vessel 106 to form a solution of the UHMW PE and the spinning solvent. One example of forming a solution of UHMW PE and spinning solvent is described in co-pending U.S. patent application Ser. No. 11/393,218, filed Mar. 30, 2006, the disclosure of which is hereby incorporated by reference in its entirety. The solution of the UHMW PE and the spinning solvent is preferably a uniform, homogeneous solution, in which the UHMW PE is dissolved in the spinning solvent. Operating conditions that can facilitate the formation of a homogeneous solution include, for example, (1) raising the temperature of the liquid mixture of the UHMW PE and the spinning solvent to a temperature near or above the melting temperature of the UHMW PE, and (2) maintaining the liquid mixture at the raised temperature for a sufficient amount of time to allow the spinning solvent to diffuse into the UHMW PE and for the UHMW PE to diffuse into the spinning solvent. When the solution is uniform, or sufficiently uniform, the final gel spun yarn can have improved properties such as increased tenacity. One method of determining whether the solution is sufficiently uniform is by sampling solution yarn as it leaves the spinneret as described below, and drawing the solution yarn by hand. When the solution is sufficiently uniform, the solution yarn will be smooth when drawn by hand. On the other hand, a non-uniform solution can result in the hand drawn solution yarn having a bumpy appearance, which can be referred to as having the appearance of a string of pearls.

It is notable that the formation of a clear liquid including UHMW PE and spinning solvent is not equivalent to forming a homogeneous solution. For example, a study was conducted of a single ultrahigh molecular weight polyethylene particle of about 150 micron diameter in a static spinning solvent on a hot stage microscope (M. Rammoorthy, Honeywell International Inc. unpublished work). As the hot stage temperature approached the polyethylene melting point, the particle gradually seemingly "dissolved" at its outer fringes and then disappeared from view over a narrow temperature range and within a short time. However, when the hot stage was cooled down, the particle re-crystallized and reappeared. Apparently, the particle had simply melted without dissolving. In the molten state, the particle could not be seen because the index of refraction of the molten polyethylene was very close to that of the solvent.

Referring back to FIG. 1, the liquid mixture of UHMW PE and spinning solvent that exits the extruder 102 can be passed via a pump 104, such as a positive displacement pump, to the heated vessel 106. The heated vessel 106 can include one or more mixers, which can be, for example, static mixers. The heated vessel 106 can be at any suitable temperature above the melting temperature of the UHMW PE. For example, heated vessel 106 can have a temperature of at least about 140° C. In one example, the heated vessel 106 can have a temperature from about 220° C. to about 320° C., and preferably from about 220° C. to about 280° C. The heated vessel 106 can have a volume sufficient to provide an average residence time of the liquid mixture in the heated vessel 106 to form a solution of the UHMW PE in the solvent. For example, the residence time of the liquid mixture in the heated vessel 106 can be from about 2 minutes to about 120 minutes, preferably from about 6 minutes to about 60 minutes.

In an alternative example, the placement and utilization of the heated vessel and the extruder can be reversed in forming the solution of UHMW PE and spinning solvent. In such an example, a liquid mixture of UHMW PE and spinning solvent can be formed in a heated vessel, and can then be passed through an extruder to form a solution that includes the UHMW PE and the spinning solvent.

Next, the gel spinning process can include providing the solution of UHMW PE polymer and spinning solvent from the heated vessel 106 to a spinneret 108 that produces a solution yarn. The solution can be passed from the heated vessel 106 through a metering pump, such as a gear pump, and then to the spinneret 108. The process of providing the solution of UHMW PE polymer and spinning solvent from the heated vessel 106 to the spinneret 108 can include passing the solution of UHMW PE polymer and spinning solvent through a metering pump, which can be a gear pump. The solution yarn that issues from the spinneret 108 can include a plurality of solution filaments. The spinneret 108 can form a solution yarn having any suitable number of filaments, including for example, at least about 100 filaments, at least about 200 filaments, at least about 400 filaments, or at least about 800 filaments. In one example, the spinneret 108 can have from about 10 spinholes to about 3000 spinholes, and the solution yarn can comprise from about 10 filaments to about 3000 filaments. Preferably, the spinneret can have from about 100 spinholes to about 2000 spinholes and the solution yarn can comprise from about 100 filaments to about 2000 filaments. The spinholes can have a conical entry, with the cone having an included angle from about 15 degrees to about 75 degrees. Preferably, the included angle is from about 30 degrees to about 60 degrees. Additionally, following the conical entry, the spinholes can have a straight bore capillary extending to the exit of the spinhole. The capillary can have a length to diameter ratio from about 10 to about 100, more preferably from about 15 to about 40.

The gel spinning process 100 can include drawing the solution yarn that issues from the spinneret 108 at a draw ratio of from about 1.1:1 to about 30:1 to form a drawn solution yarn. Drawing of the solution yarn can be accomplished by passing the solution yarn continuously through a gaseous zone 110 that can be, for example, a cooling chimney or a short gas-filled space. In some examples, the gaseous zone 110 can have a length of from about 0.3 centimeters to about 10 centimeters, and preferably from about 0.4 to about 5 centimeters. The gaseous zone 110 can be filled with an inert gas such as nitrogen, or, in examples where the residence time of the solution yarn in the gaseous zone 110 is less than about 1 second, the gaseous zone 110 can alternatively be filled with air. In examples where the gaseous zone 110 is a cooling chimney, a cooling gas can be used to cool the solution yarn and evaporate at least a portion of the spinning solvent.

The gel spinning process 100 can include cooling the drawn solution yarn to a temperature below the gel point of the UHMW PE polymer to form a gel yarn. The step of cooling can include quenching the drawn solution yarn in a liquid quench bath 112. The liquid in the liquid quench bath 112 can be selected from the group consisting of water, ethylene glycol, ethanol, iso-propanol, a water soluble antifreeze, and mixtures thereof. The temperature of the liquid quench bath 112 can be from about −35° C. to about 35° C.

The gel spinning process 100 can include drawing the gel yarn in one or more stages at a first draw ratio DR1 of from about 1.1:1 to about 30:1. Drawing the gel yarn in one or more stages at the first draw ratio DR1 can be accomplished by passing the gel yarn through a first set of rollers 114. Preferably, drawing the gel yarn at the first draw ratio DR1 can be conducted without applying heat to the yarn, and can be conducted at a temperature less than or equal to about 25° C.

Drawing the gel yarn can also include drawing the gel yarn at a second draw ratio DR2. Drawing the gel yarn at the second draw ratio DR2 can also include simultaneously removing spinning solvent from the gel yarn in a solvent removal device 116, sometimes referred to as a washer, to form a dry yarn. Removal of the spinning solution can be accomplished by any suitable method, including, for example, drying, or by extracting the spinning solvent with a low boiling second solvent followed by drying.

The dry yarn can preferably include less than about 10 percent by weight of any solvent, including spinning solvent and any second solvent that is utilized in removing the spinning solvent. Preferably, the dry yarn can include less than about 5 weight percent of solvent, and more preferably less than about 2 weight percent of solvent.

The gel spinning process can also include drawing the dry yarn at a third draw ratio DR3 in at least one stage to form a partially oriented yarn (POY). Drawing the dry yarn at the third draw ratio can be accomplished, for example, by passing the dry yarn through a draw stand 118. The third draw ratio can be from about 1.10:1 to about 2.00:1. Drawing the gel yarn and the dry yarn at draw ratios DR1, DR2 and DR3 can be done in-line. In one example, the combined draw of the gel yarn and the dry yarn, which can be determined by multiplying DR1, DR2 and DR3, and can be written as DR1×DR2×R3 or (DR1)(DR2)(DR3), can be at least about 5:1, preferably at least about 10:1, more preferably at least about 15:1, and most preferably at least about 20:1. Preferably, the dry yarn is maximally drawn in-line until the last stage of draw is at a draw ratio less than about 1.2:1. Optionally, the last stage of drawing the dry yarn can be followed by relaxing the partially oriented yarn from about 0.5 percent to about 5 percent of its length.

The partially oriented yarn (POY) can have any suitable intrinsic viscosity. In some examples, the intrinsic viscosity of the partially oriented yarn (POY) can be greater than about 17 dl/g, and can be from about 17 dl/g to about 20 dl/g, including, but not limited to being about 18 dl/g, about 19 dl/g, or greater than about 19 dl/g. Additionally, the partially oriented yarn (POY) can have a tenacity of at least about 12 g/d (10.8 g/dtex). Preferably, the partially oriented yarn (POY) can have a tenacity from about 12 g/d (10.8 g/dtex) to about 25 g/d (22.5 g/dtex), including, but not limited to being 13 g/d (11.7 g/dtex), 14 g/d (12.6 g/dtex), 15 g/d (13.5 g/dtex), 16 g/d (14.4 g/dtex), 17 g/d (15.3 g/dtex), 18 g/d (16.2 g/dtex), 19 g/d (17.1 g/dtex), 20 g/d (18 g/dtex), 21 g/d (18.9 g/dtex), or about 22 g/d (19.8 g/dtex), 23 g/d (20.7 g/dtex), or 24 g/d (21.6 g/dtex). In some examples, the partially oriented yarn (POY) can have a tenacity that is greater than about 25 g/d (22.5 g/dtex) The tenacity of the partially oriented yarn (POY) can be measured in accordance with ASTM D2256-02 at 10 inch (25.4 cm) gauge length and a strain rate of 100%/min.

The gel spinning process 100 as described above results in a continuous in-line production of the partially oriented yarn (POY). In one example, the partially oriented yarn (POY) can be continuously produced at a rate of least about 0.35 g/min per filament of the partially oriented yarn (POY), preferably at least about 0.60 g/min per filament, more preferably at least about 0.75 g/min per filament, and most preferably at least about 1.00 g/min per filament.

The gel spinning process 100 can also include winding the partially oriented yarn (POY) as yarn packages, or on a beam, with winders 120. Winding can preferably be accomplished without twist being imparted to the partially oriented yarn (POY).

The gel spinning process 100 can also include transferring the partially oriented yarn (POY) to a post drawing operation 122. The post drawing operation can be discontinuous and separate from the in-line production of the partially oriented yarn (POY). The post drawing operation can include unrolling the partially oriented yarn (POY), and drawing the partially oriented yarn (POY) to form a highly oriented yarn (HOY) product. Drawing of the partially oriented yarn (POY) to form a highly oriented yarn (HOY) product can be accomplished in at least one stage, and can preferably be conducted in a heated environment provided by a heating apparatus, such as an oven, at a post drawing temperature of from about 125° C. to about 160° C. It should be noted that the partially oriented yarn generally is not drawn until it reaches the post drawing temperature. Drawing the partially oriented yarn (POY) to form a highly oriented yarn (HOY) product can include drawing the partially oriented yarn (POY), when the partially oriented yarn (POY) is at the post drawing temperature, to a fourth draw ratio DR4 of from about 1.8:1 to about 15:1 to form the highly oriented yarn (HOY) product. The drawing rate of the partially oriented yarn (POY) during a post drawing operation is preferably a constant value. The drawing profile of the partially oriented yarn (POY) during a post drawing operation is preferably a straight line, with the slope of the drawing profile being a constant value. The drawing profile is the amount of change in the velocity of the partially oriented yarn (POY) divided by the amount of change in the distance traveled by the partially oriented yarn (POY) along the yarn path of the post drawing operation 122. The drawing profile is thus the slope of a graph of velocity versus distance, and can be written as dV/dX, where V is the velocity of the partially oriented yarn (POY) and X is the distance traveled by the partially oriented yarn (POY).

The fractional post draw of the dry yarn (FOLDY) can be can be from about 0.75 to about 0.95. The FOLDY can be defined by the following equitation:

FOLDY=log(DR4)/log((DR3)(DR4))

The post drawing operation can include drawing the partially oriented yarn (POY) in a forced convection oven, and preferably the drawing of the partially oriented yarn in the post drawing operation can be done in air. The post drawing operation can, for example, include the conditions described in U.S. Pat. No. 6,969,553, U.S. Pat. No. 7,370,395, or in United States Published Application Serial No. 2005/0093200, each of which is incorporated herein in its entirety.

Figure 2:
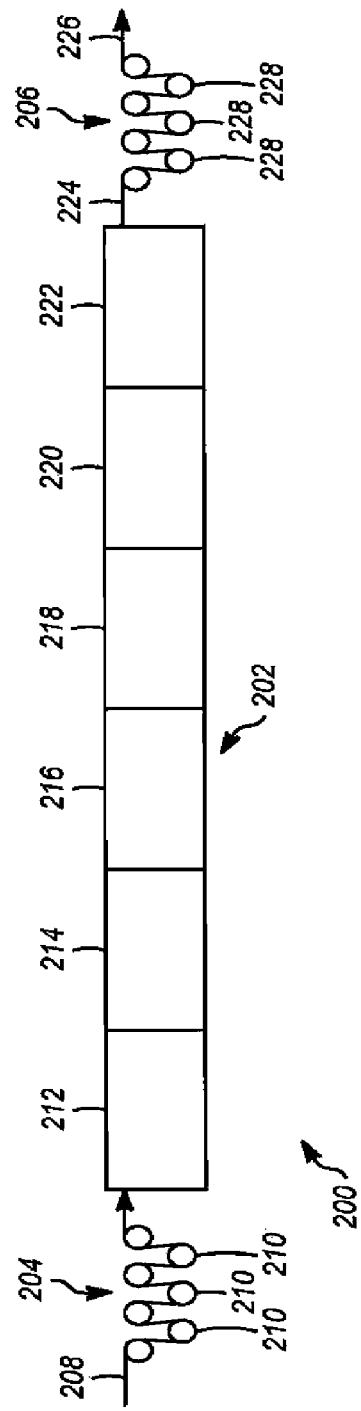
FIG. 2 illustrates one example of a post draw process that can be utilized in a process of FIG. 1.

One example of a post drawing process is illustrated in FIG. 2. The post drawing process 200 as illustrated includes a heating apparatus 202, a first set of rolls 204 that are external to the heating apparatus 202, and a second set of rolls 206 that are external to the heating apparatus 202. The partially oriented yarn (POY) 208 can be fed from a source and passed over the first set of rolls 204. The first set of rolls 204 can be driven rolls, which are operated to rotate at a desired speed to provide the partially oriented yarn (POY) 208 to the heating apparatus 202 at a desired feed velocity of $V_1$ meters/minute. The first set of rolls 204 can include a plurality of individual rolls 210. In one example, the first few individual rolls 210 are not heated, and the remaining individual rolls 210 are heated in order to preheat the fibers of the partially oriented yarn (POY) 208 before it enters the heating apparatus 202. Although the first set of rolls 204 includes a total of seven (7) individual rolls 210 as shown in FIG. 2, the number of individual rolls 210 can be higher or lower, depending upon the desired configuration.

The partially oriented yarn (POY) 208 can be fed into the heating apparatus 202, which can include one or more ovens. The one or more ovens can be adjacent horizontal ovens. Each oven is preferably a forced convection air oven. Because it is desirable to have effective heat transmission between the partially oriented yarn (POY) 208 and the air in the one or more ovens, the air circulation within each oven is preferably in a turbulent state. The time-averaged air velocity within each oven in the vicinity of the partially oriented yarn (POY) 208 can preferably be from about 1 meter/minute to about 200 meters/minute, preferably from about 2 meters/minute to about 100 meters/minute, and more preferably from about 5 meters/minute to about 100 meters/minute. In the illustrated example, six adjacent horizontal ovens 212, 214, 216, 218, 220, and 222 are shown, although any suitable number of ovens can be utilized, including, for example, one oven, two ovens, three ovens, four ovens, five ovens, seven ovens, eight ovens, or more than 8 ovens. The heating apparatus can have a total yarn path length of L meters. Each of the one or more ovens can each have any suitable length to provide the desired yarn path length. For example, each oven may be from about 10 feet to about 16 feet (3.05 meters to 4.88 meters) long, more preferably from about 11 feet to about 13 feet (3.35 meters to 3.96 meters) long. The temperature and speed of the partially oriented yarn (POY) 208 through the heating apparatus 202 can be varied as desired. For example, one or more temperature controlled zones may exist in the heating apparatus 202, with each zone having a temperature of from about 125° C. to about 160° C., more preferably from about 130° C. to about 160° C., or from about 150° C. to about 160° C. Preferably the temperature within a zone is controlled to vary less than ±2° C. (a total less than 4° C.), more preferably less than ±1° C. (a total less than 2° C.).

The path of the partially oriented yarn (POY) 208 in heating apparatus 202 can be an approximate straight line. The tension profile of the partially oriented yarn (POY) 208 during the post drawing process can be adjusted by adjusting the speed of the various rolls or by adjusting the temperature profile of the heating apparatus 202. For example, the tension of the partially oriented yarn (POY) 208 can be increased by increasing the difference between the speeds of consecutive driven rolls or decreasing the temperature in the heating apparatus 202. Preferably, the tension of the partially oriented yarn (POY) 208 in the heating apparatus 202 is approximately constant, or is increasing through the heating apparatus 202.

A heated yarn 224 exits the last oven 222 and can then be passed over the second set of rolls 206 to form the finished highly oriented yarn (HOY) product 226. The second set of rolls 206 can be driven rolls, which are operated to rotate at a desired speed to remove the heated yarn 222 from the heating apparatus 202 at a desired exit velocity of $V_2$ meters/minute. The second set of rolls 206 can include a plurality of individual rolls 228. Although the second set of rolls 206 includes a total of seven (7) individual rolls 228 as shown in FIG. 2, the number of individual rolls 228 can be higher or lower, depending upon the desired configuration. Additionally, the number of individual rolls 228 in the second set of rolls 206 can be the same or different from the number of individual rolls 210 in the first set of rolls 204. Preferably, the second set of rolls 206 can be cold, so that the finished highly oriented yarn (HOY) product 226 is cooled to a temperature below at least about 90° C. under tension to preserve its orientation and morphology.

Figure 3:
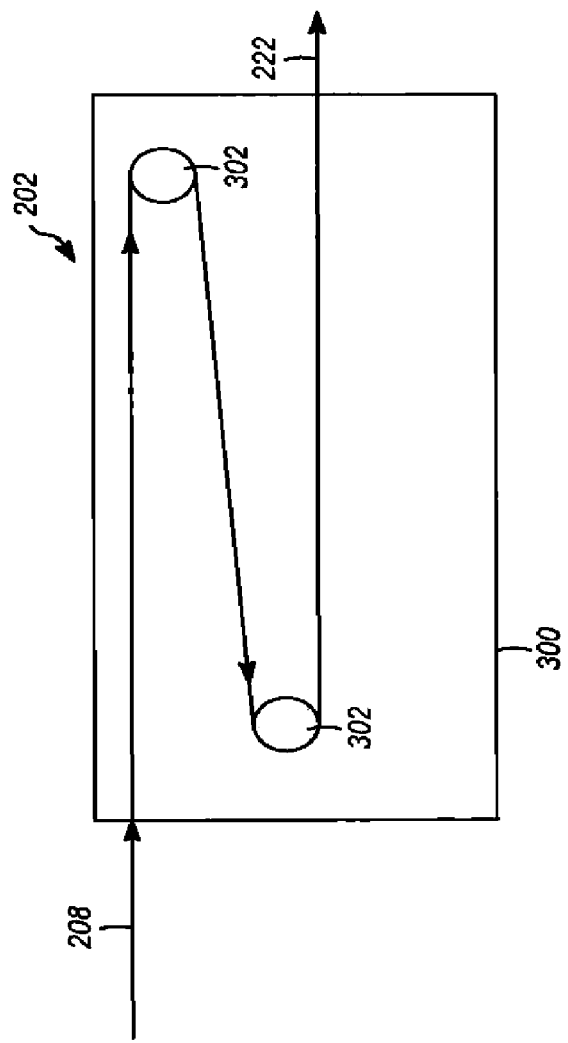
FIG. 3 illustrates one example of a heating apparatus that can be utilized in a post draw process of FIG. 2.

An alternative embodiment of the heating apparatus 202 is illustrated in FIG. 3. As shown in FIG. 3, the heating apparatus 202 can include one or more ovens, such as a single oven 300. Each oven is preferably a forced convection air oven having the same conditions as described above with reference to FIG. 2. As shown, the oven 300 can have any suitable length, and in one example can be from about 10 feet to about 20 feet (3.05 to 6.10 meters) long. The oven 300 can include one or more intermediate rolls 302, over which the partially oriented yarn (POY) 208 can be passed in the oven 300 to change its direction in order to increase the path of travel of the partially oriented yarn (POY) 208 within the heating apparatus 202. Each of the one or more intermediate rolls 302 can be a fixed roll that does not rotate, a driven roll that rotates at a predetermined speed, or an idler roll that can rotate freely, as the partially oriented yarn (POY) 208 passes over it. Additionally, each of the one or more intermediate rolls 302 can be located internal to the oven 300, as shown, or alternatively one or more intermediate rolls 302 can be located external to the oven 300. Utilization of the one or more intermediate rolls 302 increases the effective length of the heating apparatus 202. Any suitable number of intermediate rolls can be utilized in order to provide the desired total yarn path length of L meters.

In one example, the feed velocity $V_1$ meters/minute, the exit velocity $V_2$ meters/minute, and the total yarn path length of L meters can be selected to satisfy each of the following equations (1) though (4):

$$0.25 \leq L/V_1 \leq 20, \text{minutes} \quad (1)$$

$$3 \leq V_2/V_1 \leq 20 \quad (2)$$

$$1.7 \leq (V_2 - V_1) \leq 60, \text{minutes}^{-1} \quad (3)$$

$$0.20 \leq 2L/(V_2 + V_1) \leq 10, \text{minutes} \quad (4)$$

The gel spinning process can include final steps of cooling the highly oriented yarn (HOY) product under tension to form a cooled highly oriented yarn (HOY) product produced, and winding up the cooled highly oriented yarn (HOY) product produced. The highly oriented yarn (HOY) product produced can have a tenacity of greater than about 45 g/d (40.5 g/dtex), including, for example, from about 45 g/d (40.5 g/dtex) to about 90 g/d (63 g/dtex), or greater than about 90 g/d (63 g/dtex). Additionally, the highly oriented yarn (HOY) product produced can have a modulus greater than about 1400 g/d, including up to about 2000 g/d, or greater than about 2000 g/d. Further, in at least some examples, the highly oriented yarn (HOY) product produced can have an intrinsic viscosity that is from about 0.2 times the intrinsic viscosity of the UHMW PE polymer from which the yarn was made to about 0.65 times the intrinsic viscosity of the UHMW PE polymer from which the yarn was made. For example, if the intrinsic viscosity of the UHMW PE is 30 dl/g, then the highly oriented yarn (HOY) product produced therefrom can be from about 6 dl/g to about 19.5 dl/g.

Example 1

Post Draw Residence Time

It has been found that the production of highly oriented yarn (HOY) having increased tenacity is partially a function of the post draw drawing rate and drawing profile. For example, a slower post draw drawing rate can generally produce a highly oriented yarn (HOY) having a greater tenacity. Samples of partially oriented yarn (POY) having an intrinsic viscosity of 18.5 dl/g produced in accordance with the process described above utilizing a UHMW PE polymer having an intrinsic viscosity of 33 dl/g, and an extruder temperature of 240° C. were each drawn in a post draw process. The post draw process had either a single pass (Std) or multiple passes (MP) through a heating apparatus at a temperature of either 150° C. or 152° C. The maximum draw ratio of the partially oriented yarn (POY) in the single pass runs was from about 3.0 to about 3.9 for the single pass (Std) runs, with a higher draw ratio resulting in yarn breakage. For multiple pass (MP) runs, the maximum draw ratio was determined to be from about 4.5 to about 6.0.

Figure 4:
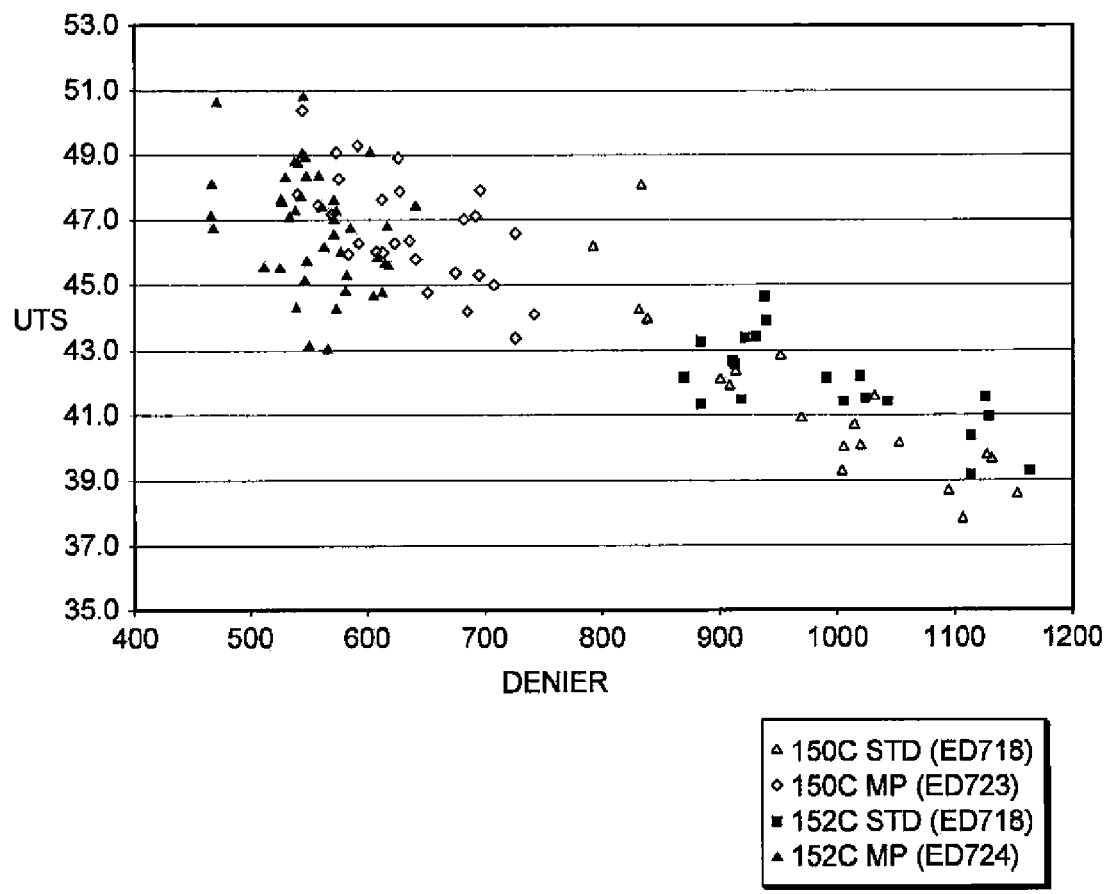
FIG. 4 illustrates a graph of test results for various UHMW PE gel spun yarns.

FIG. 4 is a graph that provides test results indicating the tenacity of the highly oriented yarns produced by these processes. FIG. 4 is a graph of the tenacity (UTS) versus the draw ratio in deniers. As can be seen in FIG. 4, the tenacity of the highly oriented yarn produced by post draw processes at either 150° C. or 152° C. was greater for the yarns that underwent multiple passes through the heating apparatus.

Example 2

Gel Spun Yarn

A solution including a spinning solvent and an UHMW PE polymer having an intrinsic viscosity of about 60 dl/g is formed with an extruder temperature at 280° C. and the heated vessel at 290° C. The concentration of the polymer in the slurry entering the extruder is about 6% and the temperature of the slurry is about 100° C. After forming a homogenous spinning solution with the extruder and the heated vessel, the solution is spun through a 181 holes spinneret with spinneret diameter of 0.35 mm and L/D 30:1. There is a 0.75 inch air gap between the spinneret and a water quench bath. The solution yarn is stretched in the 0.75 inch (1.9 cm) air gap at a draw ratio of about 2:1 and then quenched in the water bath having a water temperature of about 10° C. The gel yarn is cold stretched with sets of rolls at 3:1 draw ratio before entering into a solvent removal device. In the solvent removal device, the gel fiber is drawn at about 2:1 draw ratio. The resulted dry yarn is drawn by four sets of rollers at three stages to form a partially oriented yarn (POY) with tenacity of about 40 g/d. The partially oriented yarn (POY) is drawn at 152° C. with 5 passes within a 25 meter oven. The feed speed of the partially oriented yarn (POY) is adjusted so that the residence time for drawing achieves the maximum draw ratio of greater than about 10:1. The tenacity of the highly oriented yarn (HOY) product is about 90 g/d, with a modulus of about 2000 g/d.

Example 3

Ballistic Testing

Ballistic articles, such as soft or hard armor can be made from gel spun yarns. In this example, soft armor and hard armor composite panels were constructed from gel-spun UHMW PE yarns. The yarn utilized in the Control Sample had a tenacity of 37.5 g/d and a modulus of 1350 g/d. The yarn utilized in the Test Sample, which was made in accordance with the processes described herein, had a tenacity of 45 g/d and a modulus of 1450 g/d. The Test Samples and Control Samples were constructed with the same fiber volume fraction and the same matrix resin. The protective power of a structure can be expressed by citing the impact velocity at which 50% of the projectiles are stopped, and is designated the V50 value, which is expressed in feet per second. The V50 values of the composite panels was tested for various types of ammunition, and the test results are provided in Table 1 below.

TABLE 1

| Soft Armor | | |
|---|---|---|
| Ammunition | Test Sample (ADC 0.76 psf) | Control Sample (ADC 0.76 psf) |
| 9 mm FMJ | 1884 | 1730 |
| .357 Mag JSP | 1758 | 1630 |
| .44 Mag SJHP | 1642 | 1530 |
| Hard Armor | | |
| Ammunition | Test Sample | Control Sample |
| 17 gr FSP (ADC 1.0 psf) | 2079 | 1910 |
| M80 Ball (ADC 3.5 psf) | 3047 | 2768 |
| 7.62 × 39 MSC (ADC 2.5 psf) | 2449 | 1832 |

As can be seen from the test results, the Test Sample armor made from the gel spun yarn having a 45 g/d tenacity had a higher performance than the Control Sample armor made from gel-spun yarn having a 37.5 g/d tenacity.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A ballistic article made from a gel spun yarn, which gel spun yarn is produced by a process comprising the steps of:
    feeding a slurry that comprises an UHMW PE and a spinning solvent to an extruder to produce a liquid mixture, the UHMW PE having an intrinsic viscosity (IV) in decalin at 135° C. of at least about 30 dl/g; wherein a 10 wt. % solution of said UHMW PE dissolved in mineral oil at 250° C. has a Cogswell extensional viscosity ($\lambda$) in accordance with the formula:

$$\lambda \geq 5,917(IV)^{0.8};$$

passing the liquid mixture through a heated vessel to form a homogeneous solution comprising the UHMW PE and the spinning solvent;
    providing the solution from the heated vessel to a spinneret to form a solution yarn;
    drawing the solution yarn that issues from the spinneret at a draw ratio of from about 1.1:1 to about 30:1 to form a drawn solution yarn;
    cooling the drawn solution yarn to a temperature below the gel point of the UHMW PE polymer to form a gel yarn;
    drawing the gel yarn in one or more stages at a first draw ratio DR1 of from about 1.1:1 to about 30:1;
    drawing the gel yarn at a second draw ratio DR2;
    removing spinning solvent from the gel yarn in a solvent removal device to form a dry yarn;
    drawing the dry yarn at a third draw ratio DR3 in at least one stage to form a partially oriented yarn; the partially oriented yarn having an intrinsic viscosity of greater than about 19 dl/g;
    transferring the partially oriented yarn to a post drawing operation; and drawing the partially oriented yarn at a post drawing temperature in the post drawing operation to a fourth draw ratio DR4 of from about 1.8:1 to about 15:1 to form a highly oriented yarn product having a tenacity of greater than about 45 g/d (40.5 g/dtex) and a modulus of greater than about 1400 g/d.

2. The ballistic article of claim 1 wherein the UHMW PE has average particles size from 100 microns to about 200 microns and about 90% of the particles have a particle size that is within 40 microns of the average particle size.

3. The ballistic article of claim 1 wherein the highly oriented yarn product has an intrinsic viscosity that is from about 0.2 times the intrinsic viscosity of the UHMW PE to about 0.65 times the intrinsic viscosity of the UHMW PE polymer.

4. The ballistic article of claim 1 wherein the solution comprises the UHMW PE in an amount from about 6% by weight to about 10% by weight of the solution.

5. The ballistic article of claim 1 wherein the spinning solvent is selected from the group consisting of halogenated hydrocarbons, mineral oil, decalin, tetralin, naphthalene, xylene, toluene, dodecane, undecane, decane, nonane, octene, cis-decahydronaphthalene, trans-decahydronaphthalene, low molecular weight polyethylene wax, and mixtures thereof.

6. The ballistic article of claim 1 wherein the partially oriented yarn (POY) has a tenacity from about 12 g/d (10.8 g/dtex) to about 25 g/d (22.5 g/dtex).

7. The ballistic article of claim 1 wherein the UHMW PE has an intrinsic viscosity of greater than about 30 dl/g, and the partially oriented yarn has an intrinsic viscosity of greater than about 17 dl/g.

8. A ballistic article made from a gel spun yarn, which gel spun yarn is produced by a process comprising the steps of:
feeding a slurry that comprises an UHMW PE and a spinning solvent to an extruder to produce a liquid mixture, the UHMW PE having an average particle size from about 100 microns to about 200 microns and an intrinsic viscosity in decalin at 135° C. of at least about 30 dl/g;
passing the liquid mixture through a heated vessel having a temperature from about 220° C. to about 320° C. to form a homogeneous solution comprising the UHMW PE and the spinning solvent, the solution including UHMW PE in an amount from about 5% by weight to about 20% by weight of the solution;
providing the solution from the heated vessel to a spinneret to form a solution yarn;
drawing the solution yarn that issues from the spinneret at a draw ratio of from about 1.1:1 to about 30:1 to form a drawn solution yarn;
cooling the drawn solution yarn to a temperature below the gel point of the UHMW PE polymer to form a gel yarn;
drawing the gel yarn in one or more stages at a first draw ratio DR1 of from about 1.1:1 to about 30:1;
drawing the gel yarn at a second draw ratio DR2;
removing spinning solvent from the gel yarn in a solvent removal device to form a dry yarn;
drawing the dry yarn at a third draw ratio DR3 in at least one stage to form a partially oriented yarn, the partially oriented yarn having an intrinsic viscosity of greater than about 19 dl/g;
transferring the partially oriented yarn to a post drawing operation; and
drawing the partially oriented yarn at a post drawing temperature in the post drawing operation to a fourth draw ratio DR4 of from about 1.8:1 to about 15:1 to form a highly oriented yarn product having a tenacity of greater than about 45 g/d (40.5 g/dtex) and a modulus of greater than about 1400 g/d.

9. The ballistic article of claim 8 wherein the UHMW PE has average particles size from 100 microns to about 200 microns and about 90% of the particles have a particle size that is within 40 microns of the average particle size.

10. The ballistic article of claim 8 wherein the highly oriented yarn product has an intrinsic viscosity that is from about 0.2 times the intrinsic viscosity of the UHMW PE to about 0.65 times the intrinsic viscosity of the UHMW PE polymer.

11. The ballistic article of claim 8 wherein the solution comprises the UHMW PE in an amount from about 6% by weight to about 10% by weight of the solution.

12. The ballistic article of claim 8 wherein the spinning solvent is selected from the group consisting of halogenated hydrocarbons, mineral oil, decalin, tetralin, naphthalene, xylene, toluene, dodecane, undecane, decane, nonane, octene, cis-decahydronaphthalene, trans-decahydronaphthalene, low molecular weight polyethylene wax, and mixtures thereof.

13. The ballistic article of claim 8 wherein the partially oriented yarn (POY) has a tenacity from about 12 g/d (10.8 g/dtex) to about 25 g/d (22.5 g/dtex).

14. The ballistic article of claim 8 wherein the UHMW PE has an intrinsic viscosity of greater than about 30 dl/g, and the partially oriented yarn has an intrinsic viscosity of greater than about 17 dl/g.

15. A ballistic article made from a gel spun yarn, which gel spun yarn is produced by a process comprising the steps of:
feeding a slurry that comprises an UHMW PE and a spinning solvent to an extruder to produce a liquid mixture, the UHMW PE having an intrinsic viscosity in decalin at 135° C. of at least about 30 dl/g;
passing the liquid mixture through a heated vessel to form a homogeneous solution comprising the UHMW PE and the spinning solvent;
providing the solution from the heated vessel to a spinneret to form a solution yarn;
drawing the solution yarn that issues from the spinneret at a draw ratio of from about 1.1:1 to about 30:1 to form a drawn solution yarn;
cooling the drawn solution yarn to a temperature below the gel point of the UHMW PE polymer to form a gel yarn;
drawing the gel yarn in one or more stages at a first draw ratio DR1 of from about 1.1:1 to about 30:1;
drawing the gel yarn at a second draw ratio DR2;
removing spinning solvent from the gel yarn in a solvent removal device to form a dry yarn;
drawing the dry yarn at a third draw ratio DR3 in at least one stage to form a partially oriented yarn;
transferring the partially oriented yarn to a post drawing operation; and
drawing the partially oriented yarn at a post drawing temperature in the post drawing operation to a fourth draw ratio DR4 of from about 1.8:1 to about 15:1 to form a highly oriented yarn product having a tenacity of greater than about 45 g/d (40.5 g/dtex) and a modulus of greater than about 1400 g/d.

16. The ballistic article of claim 15 wherein the UHMW PE has average particles size from 100 microns to about 200 microns and about 90% of the particles have a particle size that is within 40 microns of the average particle size.

17. The ballistic article of claim 15 wherein the highly oriented yarn product has an intrinsic viscosity that is from about 0.2 times the intrinsic viscosity of the UHMW PE to about 0.65 times the intrinsic viscosity of the UHMW PE polymer.

18. The ballistic article of claim 15 wherein the solution comprises the UHMW PE in an amount from about 6% by weight to about 10% by weight of the solution.

19. The ballistic article of claim 15 wherein the partially oriented yarn (POY) has a tenacity from about 12 g/d (10.8 g/dtex) to about 25 g/d (22.5 g/dtex).

20. The ballistic article of claim 15 wherein the UHMW PE has an intrinsic viscosity of greater than about 30 dl/g, and the partially oriented yarn has an intrinsic viscosity of greater than about 17 dl/g.

* * * * *